May 31, 1955
R. W. BAILEY ET AL
2,709,370
POWER TRANSMISSION WITH INTERMITTENTLY DRIVEN PART
Filed Jan. 31, 1955
3 Sheets-Sheet 1
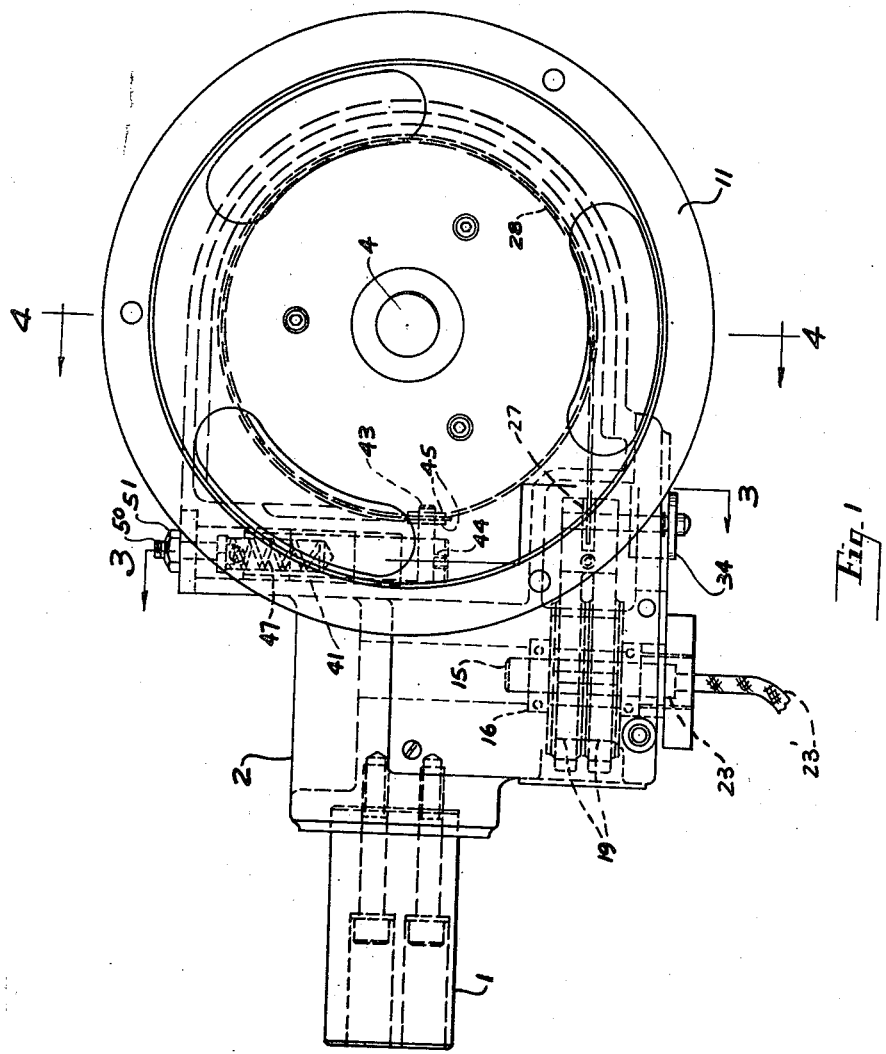
INVENTORS.
ROY W. BAILEY.
BY JOHN THOMAS FAULL.
ATTORNEY.

May 31, 1955  R. W. BAILEY ET AL  2,709,370
POWER TRANSMISSION WITH INTERMITTENTLY DRIVEN PART
Filed Jan. 31, 1955
3 Sheets-Sheet 2
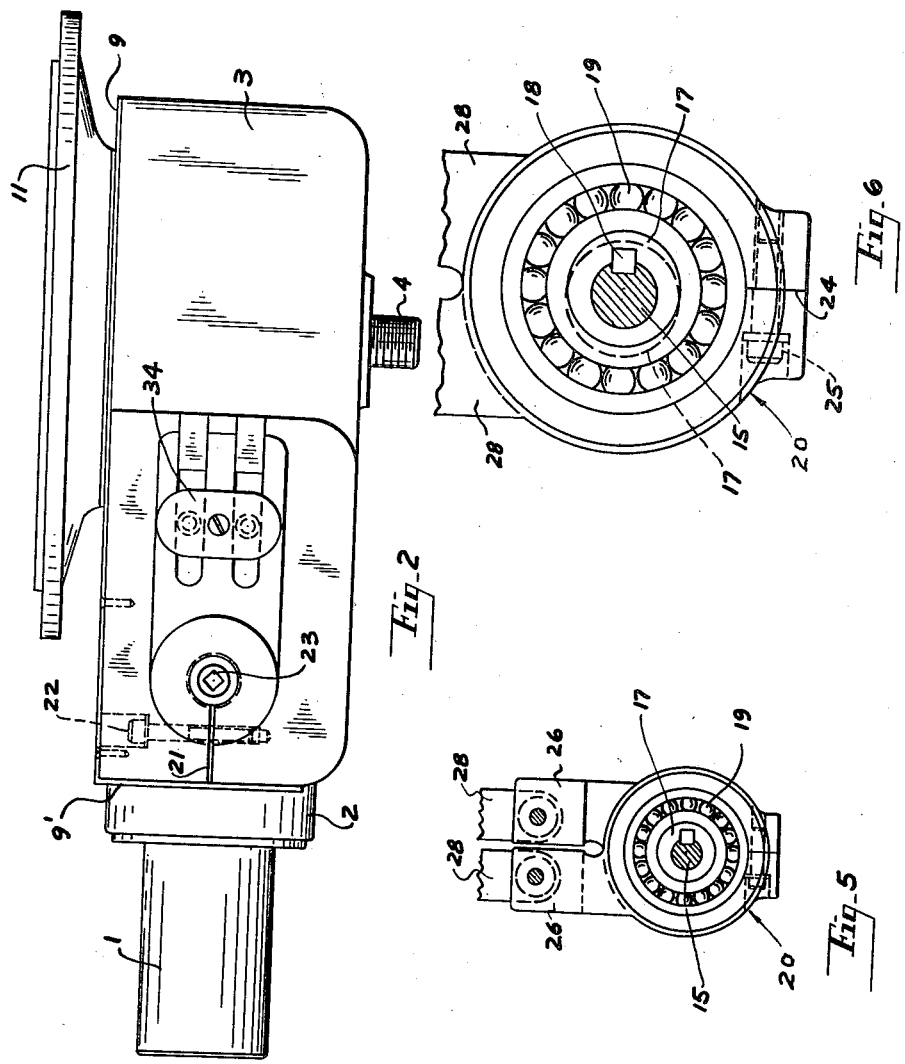
INVENTORS.
ROY W. BAILEY.
BY JOHN THOMAS FAULL.
ATTORNEY.

United States Patent Office 2,709,370
Patented May 31, 1955

2,709,370

POWER TRANSMISSION WITH INTERMITTENTLY DRIVEN PART

Roy W. Bailey and John T. Faull, Detroit, Mich., assignors to Detroit Power Screwdriver Company, Detroit, Mich., a corporation of Michigan Application January 31, 1955, Serial No. 484,943

12 Claims. (Cl. 74—116)

The present invention pertains to a novel intermittent power transmission designed especially, but not exclusively, for rotating a receptacle in the nature of a hopper containing work pieces such as screws or nuts to be alined and fed to an assembling machine.

In an intermittent power transmission, one or more bands are tightened intermittently on the surface of a rotary drum. When the band or bands slacken, they have no action on the drum, and the result is that the drum is rotated intermittently through small arcs. The frequency of the intermittent motion is very high, and the drum appears to be rotating with a constant motion. This effect is increased if two bands are used.

It has been found that this high frequency intermittent rotation is particularly suitable in the feeding of pieces such as screws, nuts, washers and the like, as set forth more fully below.

The principal object of the invention is to introduce refinements in the construction of a transmission so that it becomes practicable for general purposes and especially for the specific purpose indicated herein. Ordinarily the bands are pulled against a spring which is thereby placed in tension for return of the bands to their initial position on the slack movement. According to the invention, the springs are compressed rather than tensioned, and this arrangement permits a fine adjustment of the springs for regulating the torque of the motor. The bands, instead of acting directly on the springs, pull on slidably mounted anchor pins which in turn are acted upon by the springs. The construction is thereby made more durable for long wear.

The aforementioned intermittent movement is obtained by a pair of circular eccentrics spaced 180° apart on a drive shaft. The eccentrics are rotatable within yokes having fingers connected respectively to the bands. Another object of the invention is to guide the fingers for rectilinear movement in order to avoid lateral vibration of the bands.

Other objects and advantages of the invention will appear as the description proceeds.

Figure 4:
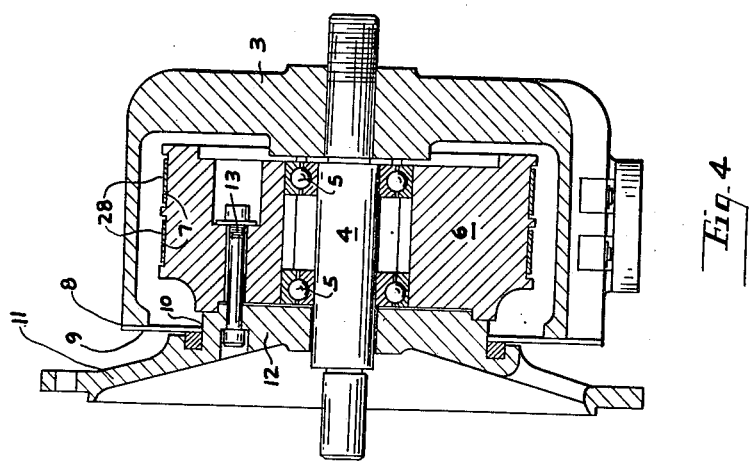
Figure 3:
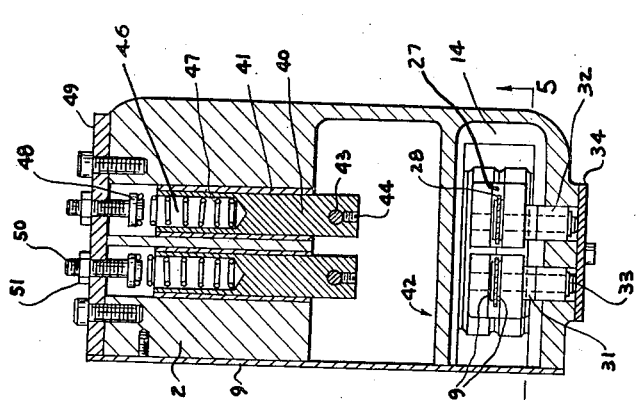

The invention is fully disclosed by way of example in the following description and in the accompanying drawings in which Figure 1 is a side elevation of the device;
Figure 2 is a bottom plan view;
Figure 3 is a section on the line 3—3 of Figure 1;
Figure 4 is a section on the line 4—4 of Figure 1;
Figure 5 is a section on the line 5—5 of Figure 3, and
Figure 6 is an enlargement of Figure 5.

Reference to these views will now be made by use of like characters which are employed to designate corresponding parts throughout.

In Figure 1 is shown a post 1 which is attached to a machine (not shown) such as an automatic screwdriver, nutdriver or the like. The post in turn carries a casting 2 which constitutes the body of the transmission and includes a hollow cylindrical portion 3.

In the portion 3 is mounted an axial stationary shaft 4 held in suitable ball bearings 5. For the purpose of illustration, the axis of the cylinder 3 is horizontal, and the shaft 4 lies in this axis. On the bearings 5 is rotatably mounted a drum 6 having a pair of peripheral grooves 7 for a purpose that will be described. One of the end walls of the portion 3 is open at 8 and is fitted with a cover plate 9 which in turn has a circular opening 10 coaxial with the shaft 4. Adjacent to the plate 9 is positioned a carrier member 11 having a hub 12 extending through the opening 10 and secured to the drum 6 by bolts 13.

For the present it may be explained that the drum 6 is rotated by means presently to be described. The carrier member 11 rotating with the drum supports a device that feeds work pieces, after properly alining them, into the machine on which the post 1 is supported.

The housing 2, adjacent to the portion 3, is formed with a substantial recess to contain the drive assembly. In this recess is held a drive shaft 15 held in a pair of spaced ball bearings 16 on an axis perpendicular to that of the stationary shaft 4. Between the bearings the shaft 15 carries a pair of eccentrics or cams 17 spaced angularly 180° apart and secured to the shaft by a key 18. Each cam is surrounded by a radial ball bearing 19, and each of these bearings is surrounded by an internally circular yoke 20.

The recessed portion of the body 2 is split at 21 radially of the shaft 15 and tightened by a screw 22. The tightness is sufficient to maintain the assembly without preventing movement thereof under the action of the drive shaft 15. One end of the shaft 15 is exposed and is formed with a square socket 23 for coupling to a flexible shaft 23', for example, or other means may be provided for applying power to the shaft 15. The yokes are also split at 24 and properly fitted on the bearings 19 by screws 25. Each yoke is also formed with a finger 26 extending non-radially therefrom, and the yokes are so assembled that the two fingers lie adjacent to each other as shown in Figure 5 and respectively tangent to the grooves 7 in the drum 6. Each finger 26 is slotted at 27 in the plane of the yoke. One end of the band 28 is extended tangentially to the corresponding groove 7 and thence about 270° along the groove, as shown in Figure 1.

Within the slots 27 the bands are fitted each with a reinforcing device 29 in the nature of an eyelet to receive a securing pin 30. The pins are extended downward to receive a spacer 31, a fiber block 32 and finally an anchor pin 33. The recess is closed at the bottom by a plate 34 which holds the parts from dropping out and is closed laterally by the plate 9 which is extended angularly at 9' to cover the adjacent end of the recess (Figure 2).

Over and adjacent to the remaining ends of the bands 28, the housing 2 receives a pair of anchor pins 40 approximately tangent to the respective bands at these ends. The members 40 are held in suitable bushings 41 and are extended inward to a cavity 42 for attachment to the bands. A pin 43 is passed through each band and into the corresponding pin 40 where it is secured by a set screw 44. The end of the band is clamped on its pin 43 by a pair of nuts or washers 45 screwed on the pin (Figure 1).

The upper end of each pin 40 is recessed at 46 to receive a coil spring 47. On the upper end of each spring is seated a plug 48. A cover plate 49 is secured on the housing 2 over the plugs, and adjusting screws 50 threaded through the plate bear on their responsive plugs and are locked by nuts 51.

In the operation of the device, the steady rotation of the drive shaft 15 produces oscillation of the yokes 20 through the action of the cams 17. The fingers 26, being suitably guided, are given a rectilinear movement lengthwise of the bands 28. At any moment, the fingers 26 are moving oppositely to one another because of the 180° angular spacing of the cams. The throw of each cam is about .035 inch for a cam diameter of about .75 inch, or at any rate the throw is small in comparison to the diameter of the drum 6 which on the same scale is about 6 inches.

When a finger 26 pulls its band 28, the opposite end of the band lifts its pin 40 against the corresponding spring 47. The band is thereby tightened resiliently on the drum and rotates the drum through a small arc corresponding to the linear displacement of the finger 26. On the opposite movement of the finger, now occurring in the other finger, the band is slackened and there is no rotation of the drum in the corresponding direction. In other words, the movement of the drum is unidirectional.

The shaft 15 is driven at a constant speed between 1750 and 2300 R. P. M. in the example shown. The frequency of increments of motion of the drum 6 is double the R. P. M. of the shaft 15, because of the cams. This high frequency gives the drum 6 and carrier 11 the appearance and effect of rotating constantly but at a greatly reduced speed.

The high frequency intermittent motion of the carrier 17 is, however, advantageous in the particular use described above. A receptacle in the nature of a hopper is carried by the member 11 and brings the work pieces to a point where they are selectively alined for transfer to the operating machine. The high frequency intermittent motion prevents frictional drag of the work pieces.

The linear guiding of the fingers 26 is affected by the blocks 32 which are so guided. These blocks consist of fiber and therefore dampen the lateral vibration induced by the action of the cams 17.

Although a specific embodiment of the invention has been illustrated and described, it will be understood that various alterations in the details of construction will be made without departing from the scope of the invention as indicated by the appended claims.

What we claim is:

1. A power transmission comprising a body, a drive shaft journalled therein, a drum rotatably mounted in said body on an axis perpendicular to said shaft, a pair of eccentrics secured to said shaft and spaced angularly 180° apart, a pair of yokes rotatably fitted on said eccentrics, a finger extending from each of said yokes, said fingers lying laterally adjacent to each other, means for guiding said fingers for rectilinear motion, bands having one end secured respectively to said fingers and passed over said drum, a pair of spring-pressed anchor pins slidably mounted in said body, the remaining ends of said bands being secured respectively to said anchoring pins.

2. A power transmission comprising a body, a drive shaft journalled therein, a drum rotatably mounted in said body on an axis perpendicular to said shaft, a pair of eccentrics secured to said shaft and spaced angularly 180° apart, a pair of yokes rotatably fitted on said eccentrics, a finger extending from each of said yokes, said fingers lying laterally adjacent to each other, means for guiding said fingers for rectilinear motion, bands having one end secured respectively to said fingers and passed over said drum, a pair of anchor pins slidably mounted in said body, the remaining ends of said bands being secured respectively to said anchoring pins, and springs backing said anchor pins in a direction to be compressed on pulling of said bands by said fingers.

3. A power transmission comprising a body, a drive shaft journalled therein, a drum rotatably mounted in said body on an axis perpendicular to said shaft, a pair of eccentrics secured to said shaft and spaced angularly 180° apart, a pair of yokes rotatably fitted on said eccentrics, a finger extending from each of said yokes, said fingers lying laterally adjacent to each other, means for guiding said fingers for rectilinear motion, bands having one end secured respectively to said fingers and passed over said drum, a pair of anchor pins slidably mounted in said body, the remaining ends of said bands being secured respectively to said anchoring pins, springs backing said anchor pins in a direction to be compressed on pulling of said bands by said fingers, and means for adjusting said springs.

4. A power transmission comprising a body, a drive shaft journalled therein, a drum rotatably mounted in said body on an axis perpendicular to said shaft, a pair of eccentrics secured to said shaft and spaced angularly 180° apart, a pair of yokes rotatably fitted on said eccentrics, a finger extending from each of said yokes, said fingers lying laterally adjacent to each other, means for guiding said fingers for rectilinear motion, bands having one end secured respectively to said fingers and passed over said drum, a pair of anchor pins slidably mounted in said body, the remaining ends of said bands being secured respectively to said anchoring pins, springs backing said anchor pins in a direction to be compressed on pulling of said bands by said fingers, plugs seated on said springs, and adjusting screws threaded in said body and bearing on said plugs.

5. A power transmission comprising a body, a drive shaft journalled therein, a drum rotatably mounted in said body on an axis perpendicular to said shaft, a pair of eccentrics secured to said shaft and spaced angularly 180° apart, a pair of yokes rotatably fitted on said eccentrics, a finger extending from each of said yokes, said fingers lying laterally adjacent to each other, means for guiding said fingers for rectilinear motion, bands having one end secured respectively to said fingers and passed over said drum, a pair of anchor pins slidably mounted in said body, the remaining ends of said bands being secured respectively to said anchoring pins, said anchor pins lying parallel to said shaft, and springs backing said anchor pins in a direction to be compressed on pulling of said bands by said fingers.

6. A power transmission comprising a body, a drive shaft journalled therein, a drum rotatably mounted in said body on an axis perpendicular to said shaft, a pair of eccentrics secured to said shaft and spaced angularly 180° apart, a pair of yokes rotatably fitted on said eccentrics, a finger extending from each of said yokes, said fingers lying laterally adjacent to each other, means for guiding said fingers for rectilinear motion, bands having one end secured respectively to said fingers and passed over said drum, a pair of anchor pins slidably mounted in said body, the remaining ends of said bands being secured respectively to said anchoring pins, said anchor pins lying parallel to said shaft, springs backing said anchor pins in a direction to be compressed on pulling of said bands by said fingers, and means for adjusting said springs.

7. A power transmission comprising a body, a drive shaft journalled therein, a drum rotatably mounted in said body on an axis perpendicular to said shaft, a pair of eccentrics secured to said shaft and spaced angularly 180° apart, a pair of yokes rotatably fitted on said eccentrics, a finger extending from each of said yokes, said fingers lying laterally adjacent to each other, bands passed over said drums, pins securing one end of each band respectively to said fingers, blocks carried by said pins and guided for rectilinear motion in said body, a pair of anchor pins slidably mounted in said body, the remaining ends of said bands being secured respectively to said anchoring pins.

8. A power transmission comprising a body, a drive shaft journalled therein, a drum rotatably mounted in said body on an axis perpendicular to said shaft, a pair of eccentrics secured to said shaft and spaced angularly 180° apart, a pair of yokes rotatably fitted on said eccentrics, a finger extending from each of said yokes, said fingers lying laterally adjacent to each other, bands passed over said drums, pins securing one end of each band respectively to said fingers, blocks carried by said pins and guided for rectilinear motion in said body, a pair of anchor pins slidably mounted in said body, the remaining ends of said bands being secured respectively to said anchoring pins, and springs backing said anchor pins in a direction to be compressed on pulling of said bands by said fingers.

9. A power transmission as set forth in claim 1, said anchor pins lying parallel to said shaft, and springs backing said anchor pins in a direction to be compressed on pulling of said bands by said fingers.

10. A power transmission as set forth in claim 1, said anchor pins lying parallel to said shaft, springs backing said anchor pins in a direction to be compressed on pulling of said bands by said fingers, and means for adjusting said springs.

11. A power transmission comprising a body, a drive shaft journalled therein, a drum rotatably mounted in said body on an axis perpendicular to said shaft, an eccentric secured to said shaft, a yoke rotatably fitted on said eccentric, a finger extending from said yoke, means for guiding said finger for rectilinear motion, a band having one end secured to said finger and passed over said drum, a spring-pressed anchor pin slidably mounted in said body, the remaining end of said band being secured to said anchor pin.

12. A power transmission comprising a body, a drive shaft journalled therein, a drum rotatably mounted in said body on an axis perpendicular to said shaft, an eccentric secured to said shaft, a yoke rotatably fitted on said eccentric, a finger extending from said yoke, means for guiding said finger for rectilinear motion, a band having one end secured to said finger and passed over said drum, an anchor pin slidably mounted in said body, the remaining end of said band being secured to said anchor pin, and spring backing said anchor pin in a direction to be compressed on pulling of said band by said finger.

References Cited in the file of this patent

UNITED STATES PATENTS

| Number | Name | Date |
| --- | --- | --- |
| 1,433,562 | Manshendel | Oct. 31, 1922 |
| 1,587,665 | Manshendel | June 8, 1926 |